(12) United States Patent
Tarnowski et al.

(10) Patent No.: US 11,788,643 B2
(45) Date of Patent: Oct. 17, 2023

(54) PNEUMATIC DAMPER FOR PISTON USED IN PRESSURE REGULATOR

(71) Applicant: Goodrich Corporation, Charlotte, NC (US)

(72) Inventors: Adrian Tarnowski, Wrocław (PL); Mateusz Pawlucki, Wrocław (PL); Kamil Czechowski, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/948,538

(22) Filed: Sep. 20, 2022

(65) Prior Publication Data
US 2023/0020949 A1 Jan. 19, 2023

Related U.S. Application Data

(62) Division of application No. 17/209,654, filed on Mar. 23, 2021, now Pat. No. 11,543,046.

(30) Foreign Application Priority Data

Mar. 23, 2020 (EP) .................................... 20461523

(51) Int. Cl.
*F16K 31/06* (2006.01)
*F16K 31/56* (2006.01)

(52) U.S. Cl.
CPC ...... *F16K 31/0693* (2013.01); *F16K 31/0613* (2013.01); *F16K 31/56* (2013.01)

(58) Field of Classification Search
CPC .. F16K 31/0693; F16K 31/0613; F16K 31/56; F16K 47/01; F16K 39/022
See application file for complete search history.

(56) References Cited

U.S. PATENT DOCUMENTS 2,360,816 A  10/1944  Pasco
3,266,668 A   4/1966  Davs
(Continued)

FOREIGN PATENT DOCUMENTS

| CN | 104662324 A | 5/2015 |
| CN | 105084151 A | 11/2015 |
| JP | 2011241904 A | 1/2011 |

OTHER PUBLICATIONS

Abstract of CN104662324A, 1 page.
(Continued)

*Primary Examiner* — Patrick C Williams
(74) *Attorney, Agent, or Firm* — CANTOR COLBURN LLP (57) ABSTRACT

A valve includes a valve housing body extending along a central longitudinal axis (X) between a first end and a second end. The valve housing comprises a first chamber at said first end comprising a gas inlet for receiving a gas and a second chamber at said second end having a plug provided at said second end, and an inter-chamber passageway connecting said first chamber to said second chamber. The valve further comprises a gas outlet provided in said inter-chamber passageway, and a piston provided in said inter-chamber passageway. The piston is movable between a first position wherein said outlet is blocked by said piston and a second position wherein said outlet is not blocked by said piston. The plug has a ventilation passageway extending therethrough. The valve has bypass channel configured to fluidly connect the first chamber to said second chamber and is not aligned with the ventilation passage.

8 Claims, 5 Drawing Sheets

(56) References Cited

U.S. PATENT DOCUMENTS

| | | |
|---|---|---|
| 4,195,658 A | 4/1980 | Dierksmeier et al. |
| 4,328,827 A | 5/1982 | Enjolras |
| 4,674,526 A | 6/1987 | Athanassiu |
| 5,169,119 A | 12/1992 | Duggal et al. |
| 5,501,791 A | 3/1996 | Theisen et al. |
| 6,038,956 A | 3/2000 | Lane |
| 6,321,770 B1 | 11/2001 | Hintzman et al. |
| 7,011,232 B2 | 3/2006 | Colombo |
| 7,931,452 B2 | 4/2011 | Hibino et al. |
| 8,806,866 B2 | 8/2014 | McBride et al. |
| 10,066,753 B2 | 9/2018 | Meyer et al. |
| 2002/0014277 A1 | 2/2002 | Togasawa et al. |
| 2013/0277585 A1 | 10/2013 | Van Weelden |
| 2021/0293347 A1 | 9/2021 | Tarnowski et al. |

OTHER PUBLICATIONS

Abstract of CN105084151A, 1 page.
Abstract of JP2011241904A, 1 page.
Extended European Search Report for International Application No. 20461523.1 dated Oct. 9, 2020, 11 pages.
U.S. Pat. No. 5,501,791A Certificate 0f Correction.

PNEUMATIC DAMPER FOR PISTON USED IN PRESSURE REGULATOR

CROSS REFERENCE TO RELATED APPLICATIONS

This application is a division of U.S. application Ser. No. 17/209,654 filed Mar. 23, 2021 which claims priority to European Patent Application No. 20461523.1 filed Mar. 23, 2020, the entire contents of which are incorporated herein by reference.

TECHNICAL FIELD

The present disclosure relates to the field of pressure regulators and more specifically pneumatic dampers that may be used in such pressure regulators. The present disclosure also relates to methods of manufacturing pneumatic dampers for such pressure regulators.

BACKGROUND

In some known pneumatic or hydraulic systems, two stage valves are used to fulfil redundancy requirements. The valves typically comprise a piston which blocks a pressurised fluid input. Such pistons are typically initially held against a pressurised fluid input by mechanical means. Upon release of the piston, the output, and therefore the input-output flowpath, of the valve is unblocked. In such designs, the released piston travels at a high velocity due to the pressurised input fluid. Such high kinetic energies of the piston can cause damage to valve components. Improvement in such systems are therefore described herein, which aim to reduce the velocity of the piston in such systems without compromising performance or reducing the input pressure.

SUMMARY

A valve is described herein comprising: a valve housing body extending along a central longitudinal axis X between a first end and a second end; said valve housing comprising: a first chamber at said first end comprising a gas inlet for receiving a gas and second chamber at said second end having a plug provided at said second end, and an inter-chamber passageway connecting said first chamber to said second chamber, said valve further comprising: a gas outlet provided in said inter-chamber passageway, and a piston provided in said inter-chamber passageway, said piston being movable between a first position wherein said outlet is blocked by said piston and a second position wherein said outlet is not blocked by said piston; and wherein said plug has a ventilation passageway extending therethrough; and wherein said valve further comprises a bypass channel configured to fluidly connect the first chamber (90) to said second chamber; and wherein said bypass channel and said ventilation passageway are not aligned with each other.

In any of the examples described herein, an outer diameter of said piston may be substantially equal to an inner diameter of said inter-chamber passageway.

In some of the examples described herein said bypass channel may extend through said piston.

In some of the examples described herein, the bypass channel may extend parallel to the longitudinal axis (X) of the valve.

In some of the examples described herein, the bypass channel may extend eccentrically through the piston.

In some of the examples described herein, said bypass channel may extend through a sidewall of said valve housing.

In some of the examples described herein, the bypass channel may be blocked by the piston when the piston is in said first position.

In some of the examples described herein, the bypass channel is blocked by the piston when the piston is in said second position.

In any of the examples described herein said piston may extend between a first end that is in communication with said first chamber and a second end that is in communication with said second chamber, and said piston may be held in said first position by a blocking means being in contact with said second end of the piston.

In any of the examples described herein said blocking means may be configured to be movable away from said second end of the piston, so that said blocking means does not contact said second end, thereby releasing the piston to move axially in the direction of the second end of the valve.

In any of the examples described herein, when said piston is in said first position, said blocking means may be held in contact with the second end of the piston by a biasing means.

The valves described herein may be two-stage valves, configured to be operable, in a first stage, to allow pressurised gas into said first chamber. In a second stage, the valve may allow axial movement of the piston into the second chamber and in the direction of the plug at the second end of the valve, to thereby open outlet port.

The outlet port may be in fluid communication with an inflatable device.

In any of the examples described herein, the inter-chamber passageway may have a smaller internal diameter than the internal diameter of the second chamber.

In any of the examples described herein the piston may extend between a first end that is in communication with said first chamber and a second end that is in communication with said second chamber and said piston may have a greater outer diameter at said second end than at said first end. The outer diameter of said piston at said second end may be greater than the inner diameter of said inter-chamber passageway.

DETAILED DESCRIPTION

Figure 1:
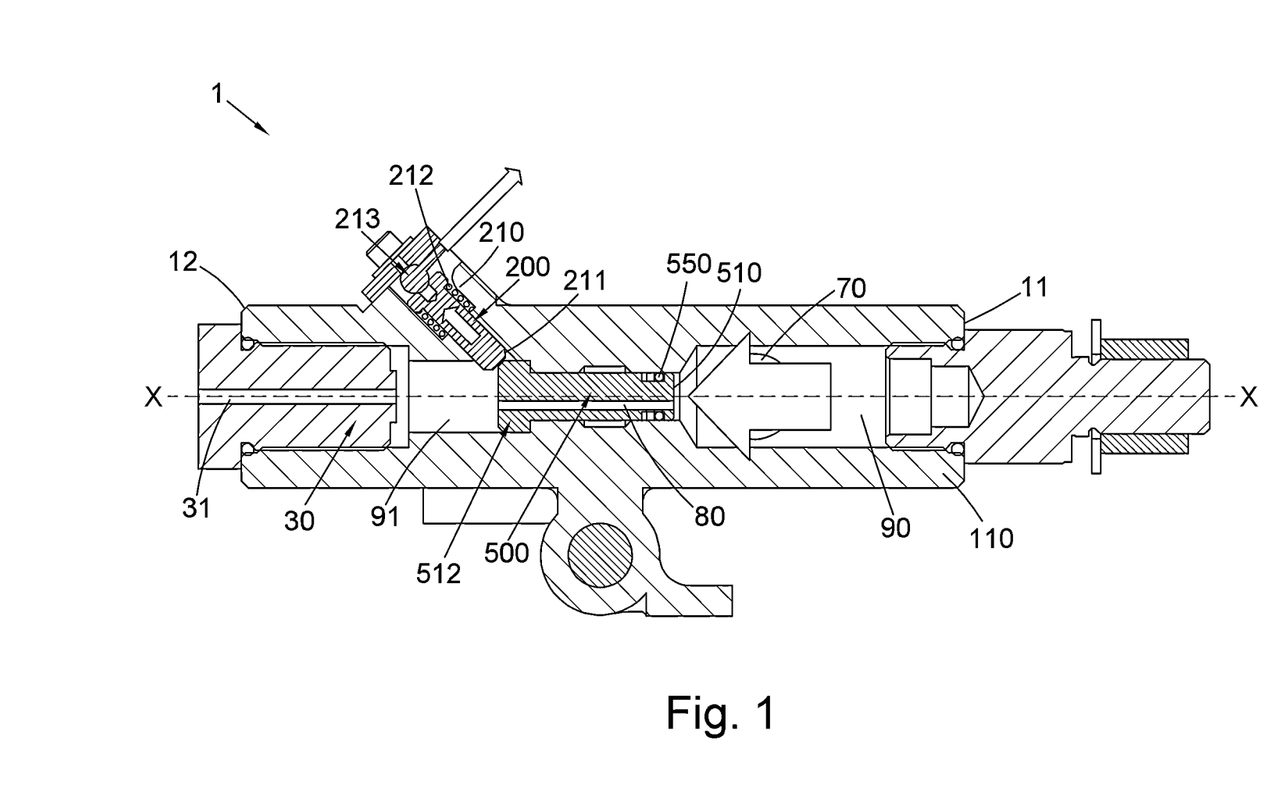
FIG. 1 shows an example of a new type of two-stage valve prior to activation and with the pin held in place via a biasing means, wherein the bypass channel is through the piston.

An example of a new type of two-stage valve 1 is illustrated in FIG. 1. The valve housing body 110 extends along a central longitudinal axis x from a first end 11 to a second end 12. The valve comprises a first chamber 90 provided at its first end 11 that is connected via an inter-chamber passageway 550 to a second chamber at its second longitudinal end 12. The inter-chamber passageway 550 may have a smaller diameter than both the first 90 and second chambers 91. A piston 500 is provided so as to be positioned in the inter-chamber passageway 550, as shown in FIG. 1. The outer diameter of the piston 500 is substantially equal to an inner diameter of said inter-chamber passageway 550 so that they provide a tight fit.

As is shown in the figures, the piston 500 may extend longitudinally between a piston first end 510 which is in contact with the first chamber 90 and a piston second end 512 which is in contact with the second chamber 91. In some examples, the piston 500 may have a larger outer diameter at its second end 512 than at its first end 510. In such examples, the outer diameter of the second end 512 of the piston 500 is also greater than the internal diameter of the inter-chamber passageway 550 in which the piston 500 is provided, such that the piston 500 cannot travel in the direction of the first chamber 90 past a certain point, as illustrated in FIG. 1.

A gas outlet 60 (shown in FIG. 4) is provided so as to extend from and be in fluid communication with this inter-chamber passageway 550 and out of the valve body through the valve body side wall. The gas outlet 60 may be connectable to an inflatable device (not shown).

The valve 1 also has a gas inlet 70 provided so as to be in fluid communication with the first chamber 90. The gas inlet 70 may be connectable to a source, or reservoir, of pressurised gas (not shown).

The valve 1 further comprises a piston blocking means which in the examples shown here comprises a channel 210 which extends from, and is in fluid communication with, the second chamber 91. This channel 210 extends from the second chamber 91 and through the side wall of the valve body 1 as shown in FIG. 1. The channel 210 may extend at an acute angle relative to the longitudinal axis X of the valve 1, as shown in the figures. Although the angle shown in the figures is approximately 45°, other angles may also be used.

Gas is prevented from being released from the second chamber 91 through this channel 210 due to the presence of a channel blocking means 200. In the examples shown and described herein, the channel blocking means 200 comprises a pin 200 which is forced in the direction of the second chamber 91 by a biasing means 212, 213. In other examples, a different blocking means may be used.

In the examples described herein, the biasing means 212, 213 may comprise a spring 211 that is provided between the outer surface of the pin 200 and the inner surface of the channel 210 and a removable component 213 positioned between the end of the pin 200 that is furthest away from the second chamber 91 and an end-stop 212 as shown in FIG. 1. The presence of the removable component 213 between the end of the pin 200 and the end-stop exerts a force on the spring 210 that forces the pin 200 in the direction of the second chamber 91. The pin 200 may be sized and shaped to that its first end 211 is in contact with the second end 512 of the piston 500. Alternatively, in any of the disclosed examples, the biasing means 212, 213 may comprise a magnetic biasing means comprising two magnets or sets of magnets. The magnets may be configured to produce a magnetic force between the pin and the valve housing body 110 or end stop 212. This can either be a repulsive force between the pin 200 and the valve housing body 110 or an attractive force between the pin 200 and the end stop 212. The removable component 213 is positioned to initially prevent movement of the pin due said magnetic force. The magnetic force is such that, upon removal of the removable component 213, the pin moves away from the second chamber, towards the end stop 212. Other biasing means may also be used.

The two-stage valve 1 may also comprise a plug 300 provided at the second end 12 of the valve body 1 in communication with the second chamber 91. This plug 300 blocks the second end 12 of the valve body and, as described below, acts as a path limiter for the piston 500, such that the piston cannot escape the valve body housing 110 through the second end 120 of the valve body.

In use, the valve is operated in two stages. The first stage comprises activating the valve by providing the pressurised gas into the inlet 70 of the valve 1.

After the first stage, and before movement of the pin 200, the piston 500 is still held in the position shown in FIG. 1. In this position, the gas pressure in the inlet chamber 90 imparts a force against the piston 500 pushing it in the direction of the second end 12 of the valve 1. The channel 210 remains blocked, however, and the contact between the pin 200 and the second end 512 of the piston 500 maintains the piston 500 in this position so that axial movement of the piston 500 along the longitudinal axis X of the valve in the direction of the second end 12 is prevented.

In this position, while the pin 200 is still held in place, the piston 500 blocks the valve outlet port 60 which, as described above, is positioned within the inter-chamber passageway 550 that extends between the first and second chambers 90, 91. Due to the fact that the piston 500 is positioned to block this outlet 60, the pressurised gas within the valve 1 cannot flow out of the outlet port 60 of the valve 1.

Figure 2:
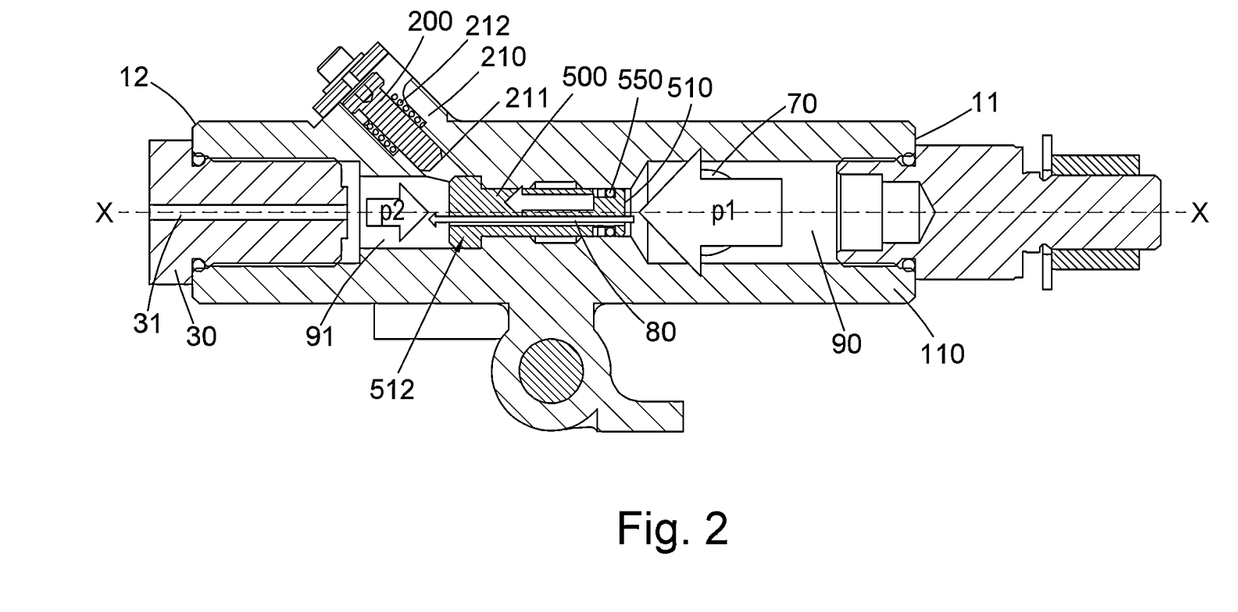
FIG. 2 shows an example of the valve of FIG. 1 with the biasing means removed from the pin.

The second stage of the activation comprises removing the removable component 213 that is exerting the bias against the spring 212 so that the pin can be moved away from the second chamber 91 to thereby allow the piston to move axially within the valve housing 110. This is shown in FIG. 2. In the examples shown herein, this may comprise pulling a cable attached to the removable component 213 so that the force on the biasing means, or spring 212 is reduced and so that the pin can move within the channel 210 in the direction away from the second chamber 91. Other means for allowing or preventing the movement of the piston 500 may also be used, however, and the examples described herein are not limited to this.

Due to this movement of the pin, the piston is no longer in contact with the pin 200. Therefore, due to the relatively higher pressure in the first chamber 90 in comparison to the second chamber 91, the piston 500 moves axially in the direction of the second end 12 of the valve and the plug 30.

Figure 3:
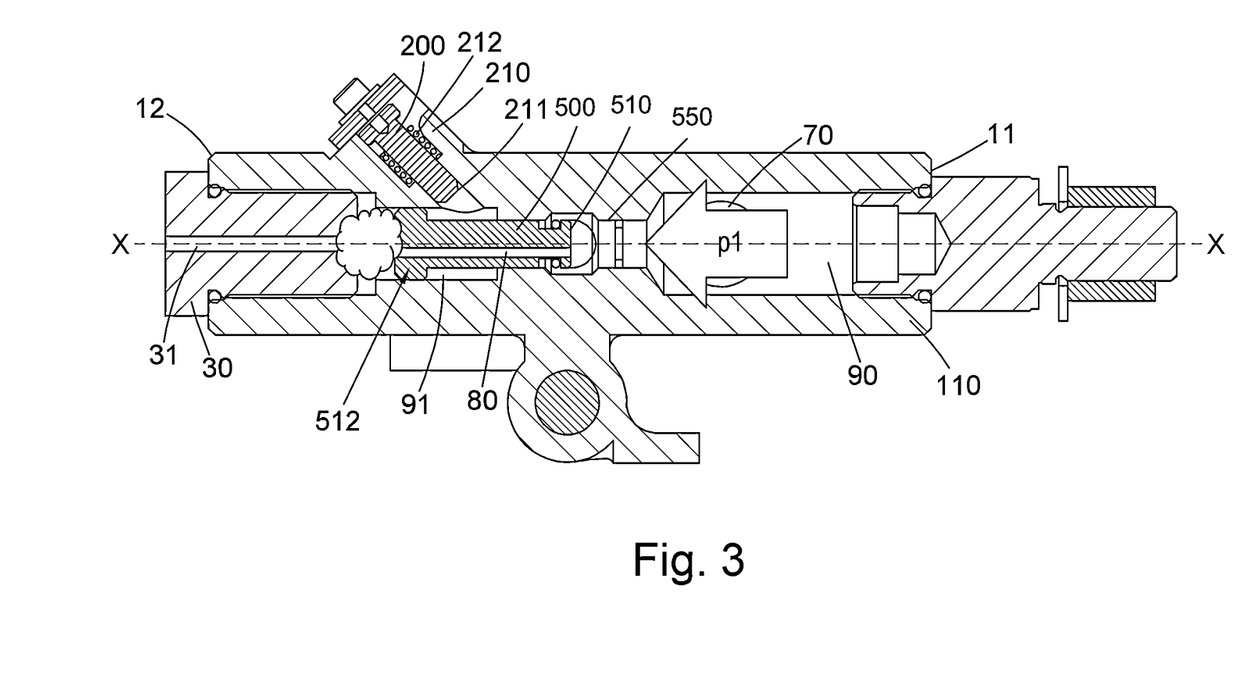
FIG. 3 shows an example of the valve of FIGS. 1 and 2 wherein the piston has moved axially so that the outlet port is uncovered and opened.
Figure 4:
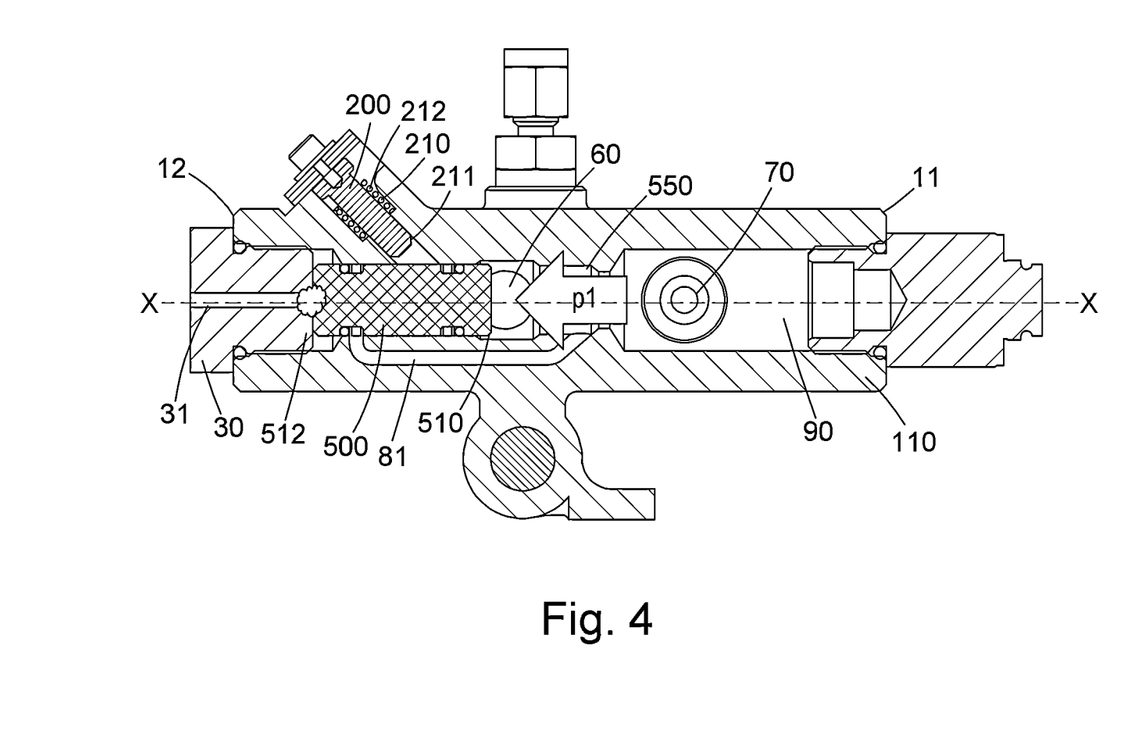
FIG. 4 shows an example of a new type of valve described herein wherein the bypass channel is through the valve body sidewall.

The piston 500 therefore moves towards the plug 300 by virtue of the pressure difference between the first chamber 90 and the second chamber 91. As the piston 500 moves further into the second chamber 91 upon release of the pin 200, the outlet port 60 provided on the side of the valve body is uncovered and opened, thereby allowing the pressurised gas 80 from the first chamber 90 to flow out of the valve body through the outlet port 60 and into the inflatable device. This is depicted in FIGS. 3 and 4.

As can be seen from the figures, the plug 30 may also be provided with a ventilation passage 31, such that, when the piston 500 moves in the direction of the second end 12 of the valve 1, the piston 500 is able to at least partially displace, rather than only compress, the gas present in the second chamber 91. The ventilation passage 31 reduces the resistance to the motion of the piston 500 caused by unwanted compression of gas in the second chamber 91. It will be appreciated that, due to presence of the ventilation passage 31, the pressure in the second chamber 91 will be substantially equal to the ambient pressure outside the valve. In practice, this will always be significantly lower than the pressure of the pressurised gas in the first chamber 90.

One of the problems associated with known valves is that, due to the large pressure difference between the pressure of the gas in the first chamber 90 and the pressure of the gas in the second chamber 91, the piston 500, upon activation of the second stage and movement of the pin 200, is accelerated to very high velocities. This means that when the piston 500 comes to rest at its final position as shown in FIG. 4 wherein it is in contact with the plug 30, it imparts a very large force on the plug 30. Such large forces can cause plastic deformation of the plug 30 or surrounding valve housing. Furthermore, the thread engagement between the plug and valve housing may be damaged.

The examples described herein therefore solve this problem by providing a valve as shown in the figures, wherein a bypass channel 80, 81 is also provided that extends between the first chamber 90 and the second chamber 91. In some examples, the bypass channel 80 may be provided so as to extend longitudinally through the piston between its first end 510 and its second end 512 as shown in FIGS. 1 to 3. Alternatively, the bypass channel 80 may extend through the sidewall of the valve body and between the first chamber 90 and the second chamber 91, as shown in FIG. 4.

In the examples shown in FIGS. 1 to 3, the bypass channel 80 is provided within the piston 500 itself and is positioned so that it is eccentric from the longitudinal axis of the piston 500. In this example, the bypass channel 80 extends non-concentrically but substantially parallel to the longitudinal axis of the piston 500 and the valve 1.

In other examples, they bypass channel 80 may extend at an angle to the longitudinal axis of the piston 500 and may take any shape of path though the piston 500, provided that the bypass channel 80 forms a non-central flowpath between one end of the piston 500 to the other.

After the second stage of the activation of the valve, the presence of this bypass channel 80 helps to dampen the effect of the movement of the piston 500 in the direction of the second end 12 of the piston and the plug 30 and thereby reduce the negative effect of such high forces as described above, which result in potential damage to the piston 500.

Additionally, due to the fact that the bypass channel 80 is not concentric with the ventilation passage 31 of the plug 30, when the piston 500 contacts the plug 30 after the valve has been fully actuated, no flowpath is formed between the bypass channel 80 and the ventilation passage 31, and so the remaining gas can only be forced out into the inflatable device via the outlet port 60.

This is desirable because the function of the valve is to supply pressurised gas to the outlet port 60, not to the external environment through plug 30. In this way, the relative positions or alignment of the bypass channel 80 and the ventilation passageway 31 provide a two-stage valve which prevents leakage of pressurised gas under operation.

As mentioned above, in some examples, the bypass channel 81 may be provided in the sidewall of the valve housing 110 instead of the piston 500. This is shown in FIG. 4. In this example the bypass channel 81 may extend from the inter-chamber passageway 550 at which the piston is located in this first position, at an acute angle to the longitudinal axis of the valve. The bypass channel 81 may also extend to the second chamber 91, proximate the plug, at which the piston is not located in its first position, at a different angle. When the piston is between its first and second position, the bypass channel 81 allows gas to flow from the first chamber 90 to the second chamber 91. When the piston reaches its second (final) position, the bypass passage 81 again becomes blocked. In the example shown in FIG. 4, the bypass channel 81 enters the second chamber at an angle that is generally perpendicular to the longitudinal axis of the valve. Other angles are also envisaged.

Figure 5:
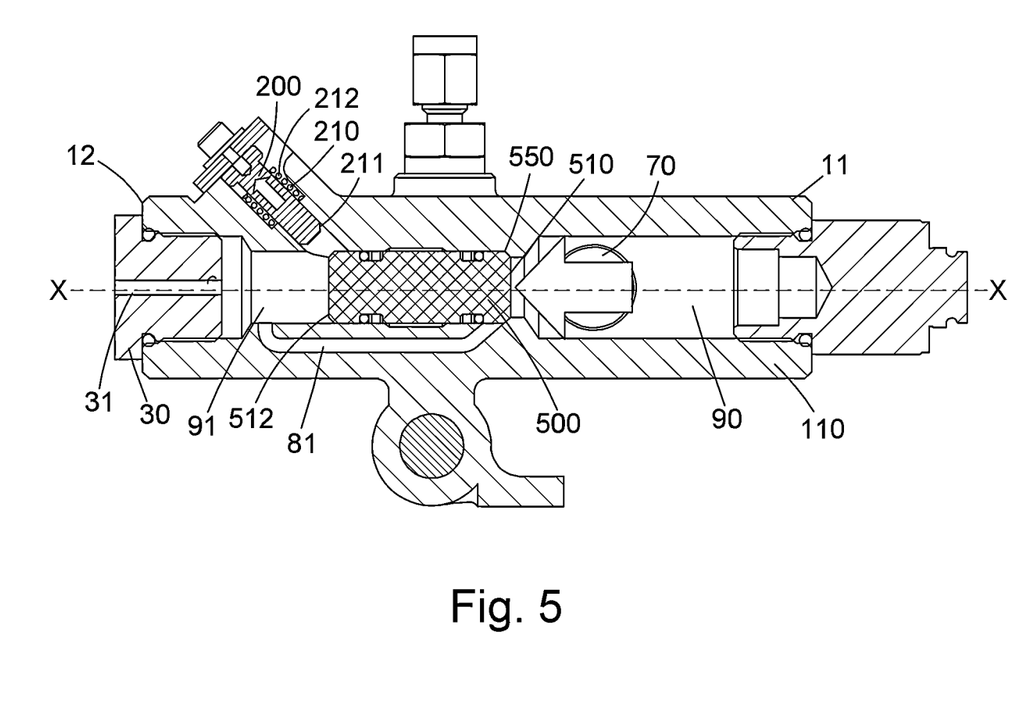
FIG. 5 shows the example of FIG. 4 shortly after removal of the pin.

As can be seen in FIG. 4, the bypass channel 80 is provided in a position wherein, when the piston 500 is in its final position, the exit of the bypass channel 81 in the second chamber 91 is blocked via the sidewall of the piston 500. Similarly, before the second stage activation of the valve, and prior to movement of the piston 500, the entrance to the bypass channel 80 in the first chamber 90 is blocked by the sidewall of the piston 500, as shown in FIG. 5, which shows the example of FIG. 4 just after movement of the pin 200.

In addition to the above, another benefit of the examples described herein is that they allow for improved ease of manufacturing in comparison to known valves. No additional parts are required to implement the examples described herein.

In some of the examples wherein the bypass channel 81 is provided in the valve housing itself (such as that shown in FIG. 4) the valve housing may be made via additive manufacturing techniques such as 3D printing. The use of such additive manufacturing methods in producing these new types of valves greatly simplifies, and therefore reduces the cost of, manufacturing thereof.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A valve, comprising:
   a valve housing body extending along a central longitudinal axis X between a first end and a second end, said valve housing comprising:
      a first chamber at said first end comprising a gas inlet for receiving a gas and
      a second chamber at said second end having a plug provided at said second end, and an inter-chamber passageway connecting said first chamber to said second chamber;
   a gas outlet provided in said inter-chamber passageway; and
   a piston provided in said inter-chamber passageway, said piston being movable between a first position wherein said outlet is blocked by said piston and a second position wherein said outlet is not blocked by said piston;
   wherein said plug has a ventilation passageway extending therethrough; and
   wherein said valve further comprises a bypass channel configured to fluidly connect the first chamber to said second chamber; and wherein said bypass channel and said ventilation passageway are not aligned with each other;
   wherein said bypass channel extends through a sidewall of said valve housing;
   wherein the bypass channel is blocked by the piston when the piston is in said first position;
   wherein the bypass channel is blocked by the piston when the piston is in said second position.

2. The valve of claim 1, wherein an outer diameter of said piston is substantially equal to an inner diameter of said inter-chamber passageway.

3. The valve of claim 1, wherein said piston extends between a first end that is in communication with said first chamber and a second end that is in communication with said second chamber, and wherein the piston is held in said first position by a blocking means being in contact with said second end of the piston.

4. The valve of claim 3, wherein said blocking means is configured to be movable away from said second end of the piston, so that said blocking means does not contact said second end thereby releasing the piston to move axially in the direction of the second end of the valve.

5. The valve of claim 3, wherein, when said piston is in said first position, said blocking means is held in contact with the second end of the piston by a biasing means.

6. The valve of claim 1, wherein the outlet port is in fluid communication with an inflatable device.

7. The valve of claim 1, wherein said inter-chamber passageway has a smaller diameter than the second chamber.

8. The valve of claim 7, wherein said piston extends between a first end that is in communication with said first chamber and a second end that is in communication with said second chamber; and
   wherein said piston has a greater outer diameter at said second end than at said first end, and wherein the outer diameter of said piston at said second end is greater than the inner diameter of said inter-chamber passageway.

* * * * *